(12) United States Patent
Nandagopal et al.

(10) Patent No.: US 10,165,066 B2
(45) Date of Patent: Dec. 25, 2018

(54) SYSTEMS, METHODS, AND APPARATUSES FOR IMPLEMENTING AN INTERFACE TO POPULATE AND UPDATE AN ENTITY GRAPH THROUGH SOCIALLY RELEVANT USER CHALLENGES

(71) Applicant: FACEBOOK, INC., Menlo Park, CA (US)

(72) Inventors: Venkataramanan Nandagopal, Sunnyvale, CA (US); Cameron Marlow, Menlo Park, CA (US); Clayton Andrews, Mountain View, CA (US); Mitu Singh, San Carlos, CA (US)

(73) Assignee: FACEBOOK, INC., Menlo Park, CA (US)

(*) Notice: Subject to any disclaimer, the term of this patent is extended or adjusted under 35 U.S.C. 154(b) by 804 days.

(21) Appl. No.: 13/834,036

(22) Filed: Mar. 15, 2013

(65) Prior Publication Data

US 2014/0280936 A1    Sep. 18, 2014

(51) Int. Cl.
*H04L 29/08* (2006.01)

(52) U.S. Cl.
CPC .............. *H04L 67/22* (2013.01); *H04L 67/20* (2013.01); *H04L 67/306* (2013.01)

(58) Field of Classification Search
CPC . H04L 43/04; H04L 43/0876; H04L 43/0823; H04L 43/00; H04L 43/045; H04L 43/12; H04L 43/16; H04L 47/762; H04L 47/748; H04L 67/02; H04L 41/22; H04L 41/28; H04L 41/5054; H04L 45/70; G06F 11/0757; G06F 11/221; G06F 11/3014; G06F 17/30876; G06F 1/3026; H04M 3/42136

USPC .......... 709/223–225; 707/227–228, 297–298
See application file for complete search history.

(56) References Cited

U.S. PATENT DOCUMENTS

| | | | |
|---|---|---|---|
| 8,997,240 B1* | 3/2015 | Kohen | G06F 21/31 713/182 |
| 9,218,819 B1* | 12/2015 | Stekkelpak | G10L 15/22 |
| 2008/0319904 A1* | 12/2008 | Carlson | G06Q 20/04 705/44 |

(Continued)

*Primary Examiner* — Younes Naji
*Assistant Examiner* — Da T Ton
(74) *Attorney, Agent, or Firm* — FisherBroyles, LLP

(57) ABSTRACT

There are provided means for implementing an interface to populate and update an entity graph through socially relevant user challenges including, for example, means of a social network system to perform operations including monitoring a user's interactions with the social network system; initiating a contextually relevant challenge for the user of the social network system based on the user's interactions monitored; identifying a plurality of concepts within an entity graph of the social network system contextually relevant to the user of the social network system; selecting one of the plurality of concepts within the entity graph upon which to base the contextually relevant challenge for the user; constructing an inquiry for the contextually relevant challenge based on missing data of the concept selected or based on data to be updated within the concept selected; presenting the contextually relevant challenge having the inquiry therein to the user; and receiving a challenge response from the user responsive to the contextually relevant challenge.

16 Claims, 8 Drawing Sheets

(56) References Cited

U.S. PATENT DOCUMENTS

| | | | |
|---|---|---|---|
| 2010/0031315 A1* | 2/2010 | Feng | G06F 21/554 726/3 |
| 2011/0029365 A1* | 2/2011 | Alhadeff | G06Q 30/0222 705/14.23 |
| 2012/0036576 A1* | 2/2012 | Iyer | G06F 21/554 726/23 |
| 2012/0192252 A1* | 7/2012 | Kuo | G06F 21/31 726/4 |
| 2012/0214442 A1* | 8/2012 | Crawford | H04W 12/06 455/411 |

* cited by examiner

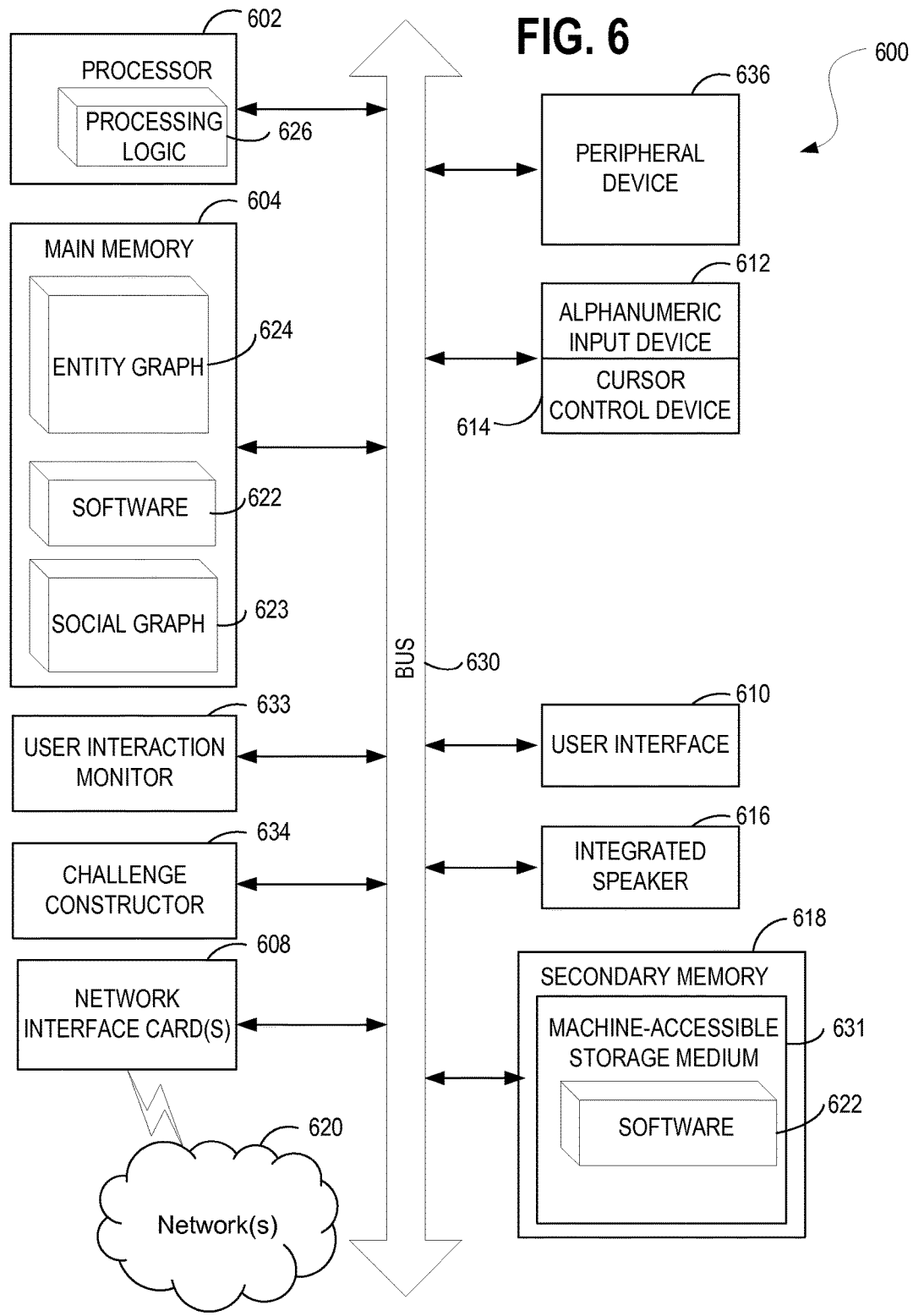

SYSTEMS, METHODS, AND APPARATUSES FOR IMPLEMENTING AN INTERFACE TO POPULATE AND UPDATE AN ENTITY GRAPH THROUGH SOCIALLY RELEVANT USER CHALLENGES

TECHNICAL FIELD

The subject matter described herein relates generally to the field of computing, and more particularly, to systems, methods, and apparatuses for implementing an interface to populate and update an entity graph through socially relevant user challenges.

BACKGROUND

Within the sciences, a "social network" is a theoretical construct used to study relationships between individuals, groups, organizations, etc., in which such individuals, groups, and organizations are described within a social structure according to their respective interactions. Ties through which any given social unit connects represent the convergence of the various social contacts of that unit.

In modern times, social networks are now available to users of the public Internet as vast repositories of data between users of the social networks according to their respective relationships and interests, as well as providing a virtual on-line meeting place for such users of the social networks.

Users of these social networks can populate data about themselves, such as their interests, preferences, and so forth, and further establish express relationships between themselves and other users of the social network. These users, their preferences, interests, and relationships amongst other users within the social network represent what may be called a "social graph" within the social network.

Other data exists within these social networks which make it easier for users to share their interests and preferences in real-world concepts and places, such as their favorite movies, musicians, celebrities, soft drinks, hobbies, sports teams, activities, vacation destinations, cities visited, cities in which the users live, and so forth. This data about real-world concepts, places, and things represent what may be called an "entity graph" within the social network.

Unlike information within the social graph which is specific to individual users of the social network system and is generally maintained and managed by the respective users themselves, managing information within the "entity graph" which is related to real-world concepts, places, and things within the entity graph of the social network is complicated by the fact that no individual "user" owns or is responsible for a given real-world concept. Notwithstanding this complication, it is nevertheless desirable to ensure that information within the entity graph is accurate, up to date, and correctly represents the corresponding real-world concept and its relationships within the entity graph of the social network system.

The present state of the art may therefore benefit from the systems, methods, and apparatuses for implementing an interface to populate and update an entity graph through socially relevant user challenges as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6 illustrates a diagrammatic representation of a machine in the exemplary form of a computer system, in accordance with one embodiment.

DETAILED DESCRIPTION

Figure 1:
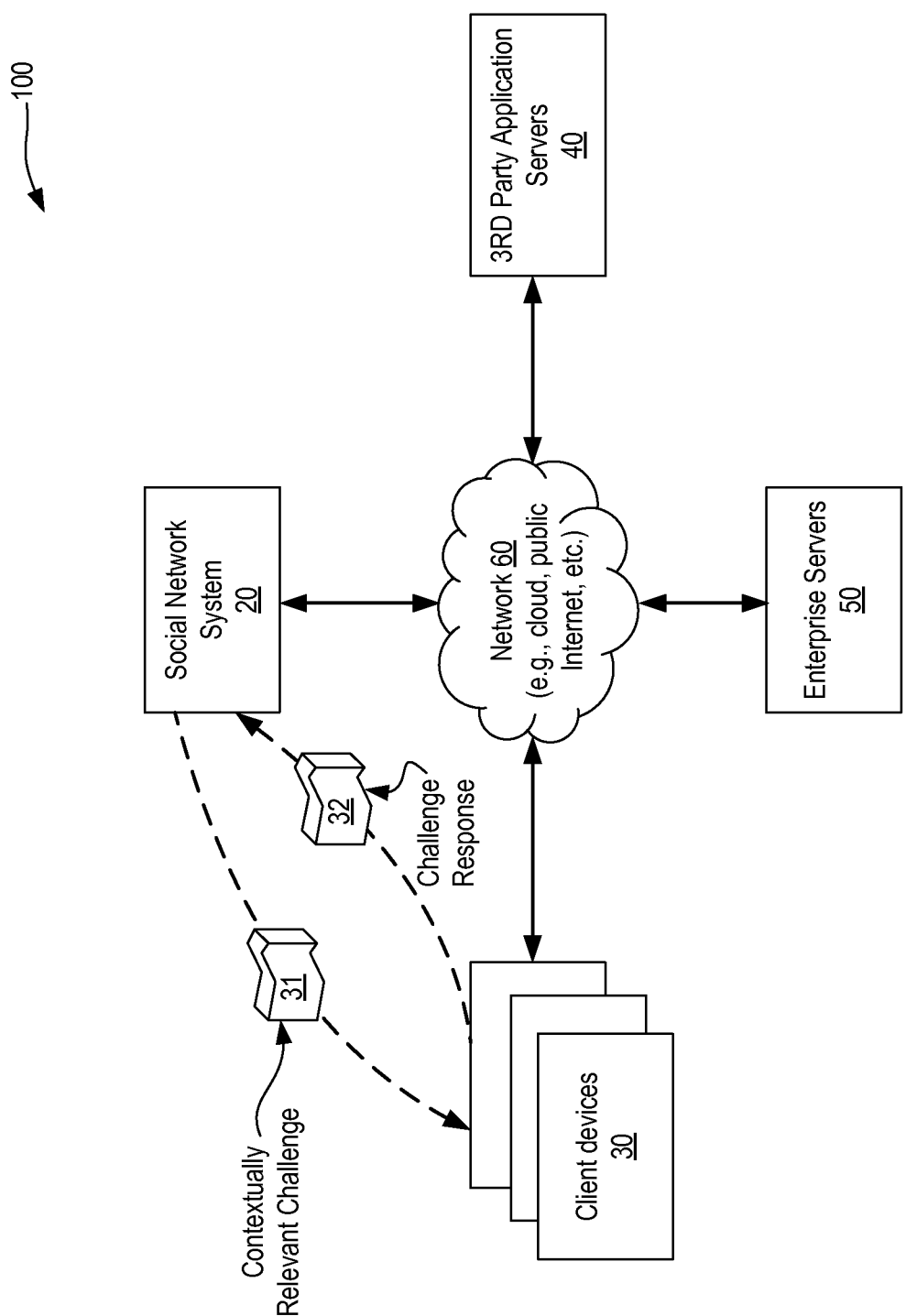
FIG. 1 illustrates an example computer network environment of an example social network environment.

Described herein are systems, apparatuses, and methods for implementing an interface to populate and update an entity graph through socially relevant user challenges. The systems, methods, apparatuses, and interfaces which are described herein enable the social network system to populate and update the entity graph through socially relevant inquires to the users of the social network system for information that should be knowable to the respective users based on that individual user's contextual relevance within the social graph and to the entity graph.

In some embodiments, a "Captcha" style approach is utilized to jointly validate suspect user activity (e.g., spamming, over-post, bot activity, typing in all capitals (CAPs), flooding, etc.) as well as to improve the stored knowledge within the entity graph. In such embodiments, validation of suspect user activity serves the additional purpose of requesting information from the user that is of value to other users or aids in populating missing information within the entity graph.

Entity graph inquires may be selected by the social network system according to one or more criteria including, for example: social relevance of the inquiry to the user being challenged by the inquiry along with one or more sub-criteria such as: (i) estimated value of the inquiry to other users, (ii) probability the user subjected to the challenge is able to correctly answer the challenge, (iii) inability of other users to answer the challenge, (iv) priority of validating candidate data that is known but lacking confidence and may be answerable by the user being challenged (v) the user's estimated expertise in an area of potential inquiry such as genres or categories for a given subject matter, and so forth.

In some embodiments, contextually relevant challenges having the inquiries therein are presented to a user of the social network system upon reaching a 404 or "Not Found" error message page indicating that the user's client successfully communicated with the servers of the social network system but requested an erroneous or un-found web-page. For instance, upon reaching the 404 or Not Found page, the social network system may present a challenge to the user requesting information which may be used to populate or update the entity graph.

Generally speaking, the entity graph inquiry permits the systematic population and validation of the entity graph through socially relevant crowdsourcing inquiries for a given user.

Within the social network system user activity is systematically monitored for various suspect activity which is either outright prohibited, discouraged, or simply an indication of potentially, but not necessarily, harmful behavior. Of particular concern to the social network system are user interactions which are being automated and carried out by a computer system purporting to be a legitimate human user. For instance, users are freely able to post comments on their page, post comments on their friends' pages, post comments and reviews about entities represented within the entity graph, such as a review for a restaurant or indicate an affinity for a given object by pressing a "Like" icon for the entity, such as "liking" a song artist or restaurant, etc.

What is not permissible within the social network system, however, is for a computer program to programmatically initiate events (such as liking) for an entity by impersonating actual human users. Similarly, it is not permissible for a computer program to automatically generate comments, reviews, posts, or other human interactions reserved for human users. For example, so called "bots" which are computer programs developed to systematically interact with the user interface of the social network system may seek to increase the relevance of a given entity, such as a song artist, by "liking" the song artist via the interaction between the computer program and the social network system rather than through legitimate interactions between human users and the social network system. In other examples, "bots" will post comments, web links, or other material into the social network system through interactions with the computerized programs rather than legitimate interactions between human users and the social network system.

When such activity is suspected by the social network system (e.g., overposting may be detected based upon the rate at which a purported user is interacting with the social network system) a validation mechanism is triggered in which the social network system presents a challenge to the purported user, in which the challenge is designed to be simple for a legitimate human user to successfully answer but computationally difficult for a computerized program, such as a bot, to successfully answer.

The mechanisms described herein for implementing an interface to populate and update the entity graph through socially relevant user challenges alters the type of challenge presented to the purported human user. For instance, rather than presenting a "Captcha" challenge in which success is determined based upon entry of a displayed image of an alphanumeric string against a known result for the string, the challenge instead presents an inquiry to the purported user which accounts for the user's contextual relevance to the social graph and the entity graph of the social network system, with the aim of both validating the purported user as a legitimate human user rather than a bot or other computer program, combined with the further aim of capturing information that may be used to populate missing information within the entity graph, update potentially out of date information within the entity graph, or validate known information within the entity graph which lacks sufficient confidence to be globally displayed.

So as to improve the depth and richness of entities represented within the entity graph, the social network system can systematically seek out additional data related to the various entities within the entity graph, for example, by crawling web sites associated with a band, such as automatically triggering a search for the band, the "Smiths," and then pulling information about the band into the corresponding entity object for the band within the social network system. For instance, an automatically triggered search may yield a Wikipedia entry for the band, from which data could be dynamically linked or simply read and then populated within the band's entity. It may be systematically determinable from such a search that the band, the "Smiths," has one or more albums, has a concert tour schedule, has known band members, all of which could then be provided as further detail about the band, the "Smiths," within the entity representation for the band. Modules of the social network system may additionally or alternatively utilize tools such as freebase to crawl available sources and rank information retrieved in according to relevance, confidence, or other criteria.

Different forms and organizational schemes may exist for the different types of entities which may exist within the entity graph. For example, different formats may be utilized based on the context of such entities, in which a band may have certain types of presentation for its structured data which may be quite different than the presentation of structured data for an entity corresponding to, for example, a city.

However, data which is retrieved systematically by the social network system may have a weak confidence level, owing to, for example, an uncertain source, poor structuring of the retrieved data, lack of confidence in the source website providing the data, or other reasons. Therefore, certain socially relevant challenges may present an inquiry to a user of the social network system and display the poor confidence information to users having a known contextually relevant link to the entity (e.g., a user that lives or works in San Francisco, for example is related to the city of San Francisco), along with a request that the user verify the information, thus increasing the confidence for the information, and its usefulness and appropriateness for inclusion with the entity at issue. Alternatively, the socially relevant challenge may present the user with an inquiry in which the user must correctly enter a response which is determined as correct or incorrect based on the stored low confidence data.

A matching response from a user for the low confidence data would thus improve the confidence in the data as well as successfully validate the user as a legitimate human user. Conversely, a non-matching response may indicate that the user is correct and the low confidence data is incorrect or may alternatively indicate that the user is not a legitimate human user, regardless of the correctness of the low confidence information. Thus, where a non-matching response is received, the social network system may simply capture the entered data from the user, trigger a failure mode for the challenge inquiry, and then simply present a new challenge inquiry which then presents the purported user with another opportunity to successfully validate by correctly answering the new challenge, which may once again be a socially relevant challenge which seeks to both validate the user and also improve the information within the entity graph.

Other examples are described in further detail below with reference to the Figures.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an example computer network environment 100 of an example social network environment. Particular embodiments may operate in, or in conjunction with, a network environment, such as the Internet, including multiple network addressable systems. Network 60 (e.g., cloud, public Internet, etc.) generally represents one or more interconnected networks, over which various systems and hosts described herein may communicate. Network 60 may include packet-based wide area networks (such as the public Internet), private networks, wireless networks, satellite networks, cellular networks, paging networks, and the like. As FIG. 1 illustrates, particular embodiments may operate in conjunction with a network environment 100 having therein a social network system 20 and client devices 30, as well as, in some embodiments, one or more third party web application servers 40 or one or more enterprise servers 50. Client devices 30, third party application servers 40, and enterprise servers 50 may be communicatively interfaced to the network environment 100 and network 60 via a network service provider, a wireless carrier, a set of routers or networking switches, or any other suitable means. Each client device 30, web application server 40, or enterprise server 50 may generally be a computer, computing system, or computing device, etc.

In particular implementations, the client applications allow a user of client device 30 to enter addresses of specific network resources to be retrieved, such as resources hosted by social network system 20, web application servers 40, or enterprise servers 50. These addresses can be Uniform Resource Locators (URLs). Links may be located within the web pages and provide an automated way for the user to enter the URL of another page and to retrieve that page. When a user at a client device 30 desires to view a particular web page hosted by social network system 20, the user's web browser transmits the request to the social network system 20 via the network 60, for example, via the cloud or public Internet.

The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device, as well as timestamp identifying when the request was transmitted.

In an example implementation, when a registered user of social network system 20 first requests a web page from social network system 20 in a given user session, the response transmitted to the user's client device 30 from social network system 20 may include a structured document generated by a page-generating process for rendering a login page at the client device. The user may then enter his or her user login credentials (e.g., user ID and password), which are then transmitted from the user's client device 30 to social network system 20. Upon successful authentication of the user, social network system 20 may then transmit a response to the user's web browser at the user's client device 30 that includes a structured document generated by page-generating process for rendering a user homepage or user profile page at the user's client device.

In certain embodiments, a contextually relevant challenge 31 is presented to the user as part of the login process, for instance, in addition to requiring a user ID and password for the user to successfully authenticate, the user must also provide a correct challenge response 32. In other embodiments, subsequent to successful authentication of a user via the login process, a contextually relevant challenge 31 is presented to the user based on the user's client device 30 requesting a 404 or not found page from the social network system 20 or based on user activity evaluated to be indicative of a computerized interaction between the user's client device 30 and the social network system 20 rather than that of a legitimate human user interacting with a user interface of the user's client device 30. In yet other embodiments, a contextually relevant challenge 31 is presented to the user's client device 30 at random timing intervals, at pre-determined timing intervals, after a random or pre-determined number of interactions between the user's client device 30 and the social network system 20, or based on other criteria established by the social network system 20 for presenting such contextually relevant challenges 31 to the user's client device 30 so as to validate the legitimacy of the purported user and further to aid in populating or updating information stored within the entity graph of the social network system 20. Such contextually relevant challenges 31 presented to the user's client device 30 even in the absence of suspect behavior may be utilized to increase the rate and quantity of populating and updating data for the entity graph.

Figure 2A:
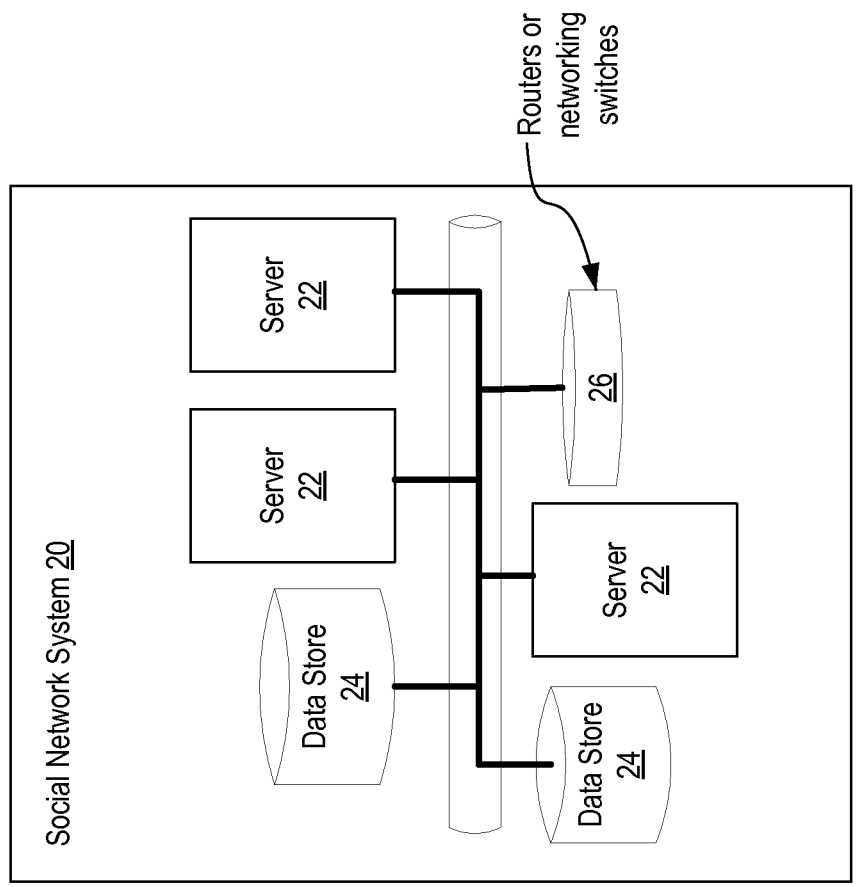
FIG. 2A illustrates example components of an example social network environment.

FIG. 2A illustrates example components of an example social network environment 200. In one example embodiment, social network system 20 comprises computing systems that allow users at client devices 30 to communicate or otherwise interact with each other and access content, such as accessing user profiles, exchanging contextually relevant challenges 31 and challenge response 32, as described herein. Social network system 20 is a network addressable system that, in various example embodiments, comprises one or more physical servers 22 as well as one or more data stores 24. The one or more physical servers 22 are communicably interfaced with network 60 via, by way of example, a set of routers or networking switches 26. The physical servers 22 may host functionality directed to the operations of social network system 20. By way of example, social network system 20 may host a website that allows one or more users, at one or more client devices 30, to view and post information, as well as communicate with one another via the website. Data stores 24 correspond to one or more of a variety of separate or integrated databases, such as relational databases and object-oriented databases that maintain information as an integrated collection of logically related records or files stored on one or more physical systems. Structurally, data stores 24 may generally include one or more of a large class of data storage and management systems. Data store 24 may include data associated with different social network system 20 users, client devices 30, web application servers 40, or enterprise servers 50, as well as, in particular embodiments, data associated with various concepts.

Figure 2B:
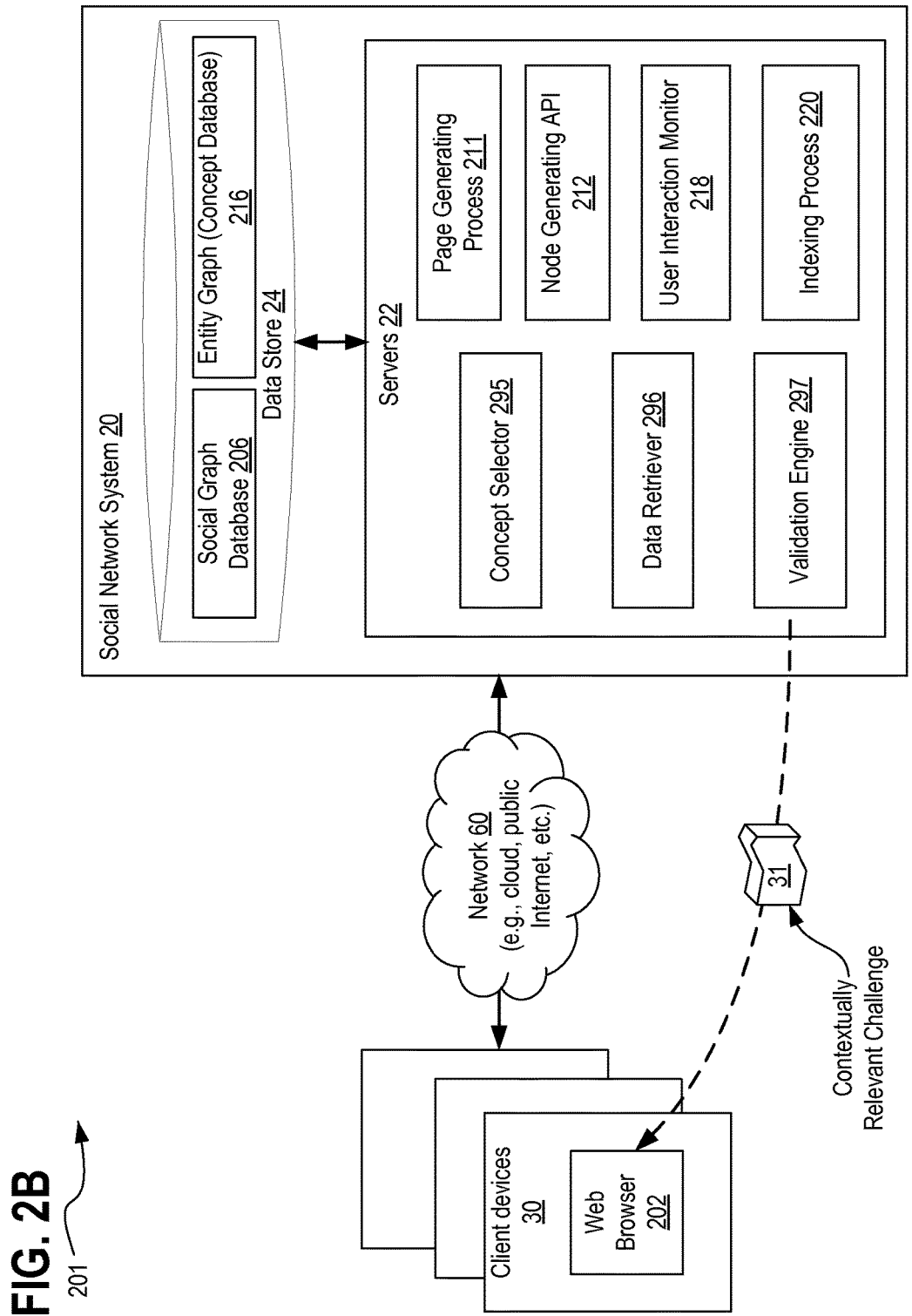
FIG. 2B illustrates an example architecture of the example social network environment of FIG. 2A and an example architecture of an example client device of FIG. 1.

FIG. 2B illustrates an example architecture 201 of the example social network environment of FIG. 2A and an example architecture of an example client device of FIG. 1. Client devices 30 having web browsers 202 therein may connect with the social network system 20 via the network 60 (e.g., the cloud, public Internet, etc.). In the following example embodiments, the social network system 20 may be described or implemented in terms of a social graph including social graph information such as user nodes representing human users of the social network system 20, as well as entity graph representing real-world concepts such as places, things, ideas and concepts, other than the user's which are represented by the user nodes within the social graph. In particular embodiments, data store 24 includes a social graph database 206 in which the social graph information for use in implementing the social network environment described herein is stored. In particular embodiments, the social graph information stored by social network system 20 in data store 24, and particularly in social graph database 206, includes a plurality of nodes and a plurality of edges that define connections between corresponding nodes.

In particular embodiments, the nodes or edges themselves are data objects, such as user objects that include the identifiers, attributes, and information (including the information for their corresponding profile pages) for their corresponding users. The nodes may also include pointers or references to other objects, data structures, or resources for use in rendering content in conjunction with the rendering of the profile pages corresponding to the respective nodes. The data store 24 further includes the entity graph 216, for example, via a concept database, having many concepts therein represented as entities or entity nodes of the entity graph. The entity nodes themselves may also have express relationships between themselves, and the entity objects representing such concepts and entities may themselves include the identifiers, attributes, and information for their corresponding entity concept page views.

Within server 22 are page generating process 211 functionality for yielding user node page views or profile views as well as yielding entity concept page views. Node generating API 212 provides functionality for spawning and managing nodes within the social graph database 206 and the entity graph (concept database) 216 as necessary. User interaction monitor 218 provides functionality in conjunction with the validation engine 297 identifies suspect user interactions with the social network system 20 and responsively triggers a validation means via the validation engine 297 to determine whether a purported user is in fact a legitimate human user, for instance, by presenting a contextually relevant challenge 31 to the web browser 202 of the user's client device 30. Concept selector 295 aids the social network system in selecting entities or concepts from within the entity graph for which the contextually relevant challenges 31 are based, for example, by seeking out contextually relevant intersects between the user being challenged and the entity or concept selected by concept selector 295 for which information will be solicited from the user to either populate or update. Concept selector 295 may further perform scoring and ranking of the potential concepts as part of its selection criteria in its choosing of the concept or entity upon which the contextually relevant challenge 31 will be based. Data retriever 296 interfaces with the data store 24 and retrieves object and node data as necessary on behalf of the other server elements to construct and issue the contextually relevant challenge 31 to the user's client device 30. Indexing process 220 functionality performs indexing of user nodes and entity nodes of the respective social and entity graphs, including adding index type links where appropriate.

Figure 3:
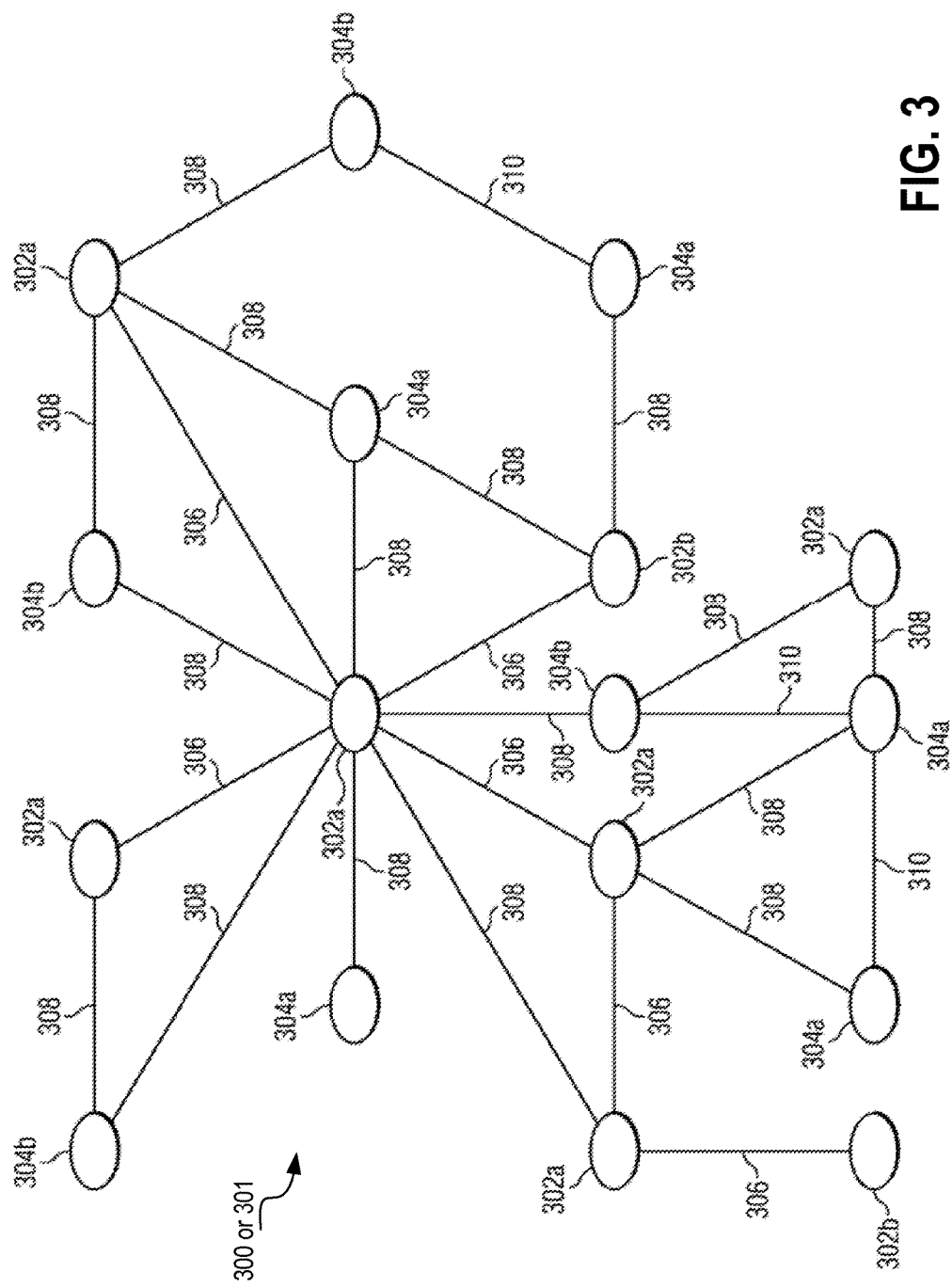
FIG. 3 illustrates an example social graph or alternatively, shows an example entity graph, in which the graph interconnects user nodes of a social graph or alternatively, in which the graph interconnects entity nodes or concepts of an entity graph.

FIG. 3 illustrates an example social graph 300 or alternatively, shows an example entity graph 301, in which the graph interconnects user nodes of a social graph 300 or alternatively, in which the graph interconnects entity nodes or concepts of an entity graph 301, shown here, for didactic purposes, in a two-dimensional visual map representation. In particular embodiments, the plurality of nodes and edges of the respective social graph 300 or entity graph 301 are stored as data objects in data store 24, and particularly social graph database 206 and entity graph (concept database) 216, as described above. Additionally, data store 24 may further include one or more searchable or queryable indexes of nodes or edges generated by indexing social graph database 206 and entity graph (concept database) 216. In particular embodiments, the plurality of nodes includes a first set of administered nodes 302 and a second set of un-administered nodes 304. In particular embodiments, the first set of administered nodes 302 (e.g., 302a and 302b) are user-administered nodes (hereinafter also referred to as "user nodes" or "entity nodes" according to the respective social graph 300 or entity graph 301) that each correspond to a respective user or entity (e.g., concept) and a respective user profile page of that user within the social graph 300 or a respective concept display page of that entity within the entity graph 301. In particular embodiments, user profile pages corresponding to user nodes 304 may be modified, written to, and administered, and entity concept display pages corresponding to entity nodes 304 (e.g., 304a and 304b) may be modified, written to, and administered. User profile pages are generally modifiable by a user having control and ownership thereof, whereas entity concept display pages may have no owner, and are systematically managed as described in accordance with the embodiments herein. For example, entity concept display pages may have their data populated and updated based on user's challenge responses 32 to contextually relevant challenges 31 by the social network system 20.

With respect to entity graphs 301 specifically, entity nodes and concepts may be administered, or contributed to, by the community of registered users of social network system 20 through crowd sourcing concepts despite individual users or user nodes of the social graph 300 lacking ownership and express control. In particular embodiments, the second set of entity nodes (e.g., concepts) nodes 304 includes a first subset of un-administered nodes 304a that each correspond to a non-generic entity node (e.g., concept) and a second subset of un-administered nodes 304b that each correspond to a generic entity node (e.g., concept). By way of example, a generic entity node (e.g., concept) may be an entity node (e.g., concept) devoted to an abstract activity, such as running, while a non-generic entity node (e.g., concept) may be an entity node (e.g., concept) devoted to a more specific concept, such as a profile page devoted to a particular club of runners.

The social network system 20 provides further means or processes, where necessary, for the true voices of entity nodes and concepts corresponding to entity node (e.g., concept) nodes 304 (or un-authenticated user profile pages corresponding to un-authenticated user nodes 302b), such as the actual celebrity or business for which an entity node (e.g., concept) node 304 has previously been created, to claim these nodes thereby assuming administrative rights over them and redefining them in the social graph 300 as appropriate for human users, or within the entity graph 301 as appropriate for administered entity nodes or concepts. As illustrated in FIG. 3, user nodes 302 and entity nodes 304 (e.g., concept nodes) stored in social graph database 206 or in the entity graph 216 may be connected with one another via edges. As described above, in some embodiments, each edge may be classified or characterized by an edge type of a plurality of edge types that define, indicate, or characterize the connection between the pair of nodes connected by the edge. By way of example, user nodes 302 and entity nodes 302 may be connected with one another via edges 306 of a first edge type. In particular embodiments, edges 306 define friendship or other social relationship connections between users (e.g., friends or friend nodes) associated with the respective user nodes 302 as socially relevant context and edges 306 define contextually relevant context for entity nodes within the entity graph (concept database) 216, such as a district within a city, members of a band, or actors of a movie, and so forth. Additionally, user nodes 302 may be connected with concept nodes 304 via edges 308 of one or more second edge types. By way of example, a user corresponding to a user node 302 may make a declaration or otherwise indicate that he or she likes, is a fan of, wants, or otherwise has an interest in or association with a concept corresponding to a particular entity node (e.g., concept) node 304, and in such a way, a user node within the social graph establishes a link, express relationship or an edge 306 to a entity node within the entity graph, thus creating an edge 306, link, or express relationship between the respective social graph 300 and entity graph 301. The user may indicate this like or interest via clicking a link on the corresponding concept node's entity node (e.g., concept) or by other suitable means, such as for example, clicking a link in the user's home or profile page in response to an invitation, clicking a link in a friend's profile page, or, in particular embodiments, by some automatic or automated means.

Furthermore, in some embodiments, various entity (e.g., concept) nodes 304 may be connected with one another in social graph database 206 via edges 310 of a third edge type. This third edge type may define an informational or categorical relationship between entity nodes (e.g., concepts) 304, some of which may tend to organize such entity nodes and concepts into hierarchies. By way of example, a generic entity node (e.g., concept) devoted to Asian food may have a link in the page to various Asian restaurants or review pages displayed in non-generic entity nodes and concepts.

Construction of the contextually relevant challenges 31 by the social network system 20 may be based on such links 306, 308, and 310 between the user being presented with the contextually relevant challenge and the respective entity node 304 that the user is being challenged about so as to populate or update information within the entity node 304.

Figure 4A:
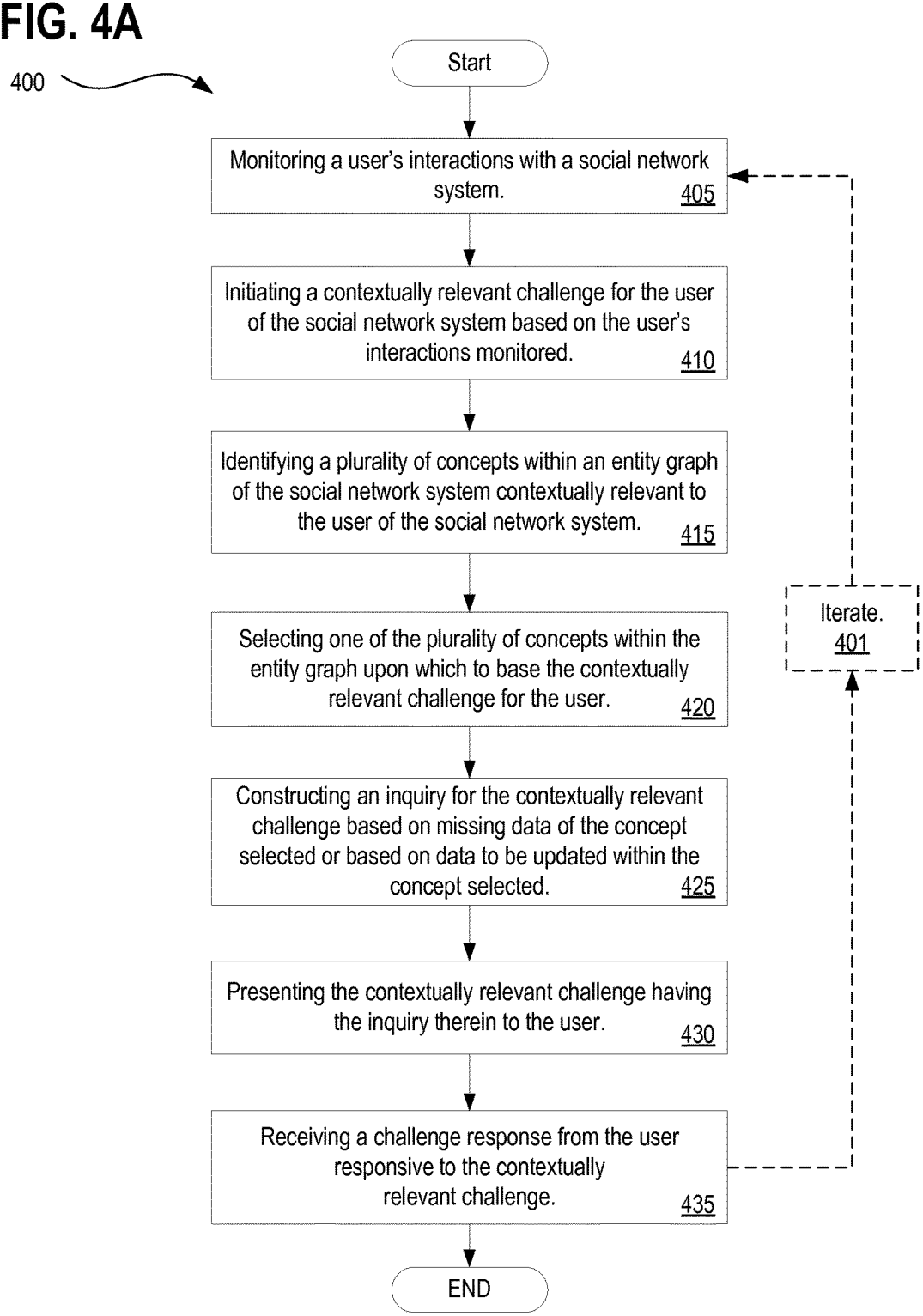
FIG. 4A is a flow diagram illustrating a method for systems, methods, and apparatuses for implementing an interface to populate and update an entity graph through socially relevant user challenges in accordance with described embodiments.

FIG. 4A is a flow diagram illustrating a method for populating and updating an entity graph through socially relevant user challenges in accordance with described embodiments. Method 400 may be performed by processing logic that may include hardware (e.g., circuitry, dedicated logic, programmable logic, microcode, etc.), software (e.g., instructions run on a processing device to perform various operations such as interfacing, querying, retrieving, identifying, selecting, monitoring, validating, displaying, etc., or some combination thereof). In one embodiment, method 400 is performed or coordinated via a social network system, such as that depicted at element 20 of FIG. 1, et seq., or the social network system 501 at FIG. 5. Some of the blocks and/or operations listed below are optional in accordance with certain embodiments. The numbering of the blocks presented is for the sake of clarity and is not intended to prescribe an order of operations in which the various blocks must occur.

Method 400 begins at block 405 with monitoring a user's interactions with a social network system. For instance, the social network system monitors the user's interactions and systematically evaluates interactions, groups of interactions, sequences of interactions, content of interactions, and so forth for suspect behavior indicative of a programmatic or computerized interaction rather than legitimate human user interactions. For instance, whenever a user takes an action on the social network system, such as commenting, posting, liking, sending a message, or any other introduction within the social network system, the interaction is processed through a set of classifiers which assess whether the users action is considered good or bad. Good may be those actions indicative of a human user and bad indicative of a non-human user. However, good may also be those actions considered appropriate for the social network system, whereas bad are those actions which may be from a legitimate human user, but not acceptable for the social network system, such as over-posting, spamming, posting memes (e.g., click this link and a dollar will be donated to charity), and so forth.

In some instances, those actions evaluated as bad are simply prohibited. However, in other instances, those instances evaluated as bad may be allowed subject to the user successfully validating as a legitimate human user via the validation means described, specifically, providing a successful challenge response to a contextually relevant challenge inquiry presented to the user. For example, a link to a known malicious website may be outright prohibited, regardless of whether the user is legitimate or a programmatic non-human entity, such as a bot, and thus, the social network system may trigger a contextually relevant challenge to the user, and a correct response challenge from the user may allow the user to initiate other actions within the social network system but invalidates the attempted action to post the link to the known malicious website. In other instances, a user may simply attempt to comment at too fast of a pace, in which the comments themselves are acceptable, but the rate at which the user is commenting triggers the social network system to evaluate the action as potentially bad or indicative of a programmatic response from a non-human user, thus triggering the contextually relevant challenge to the user. In this latter example, a successful response challenge validating the user as a legitimate human user will cause the social network system to process the attempted action by the user, thus allowing the attempted comment to be posted to the social network system, subsequent to which the user may initiate other actions within the social network system.

Bots or programmatic algorithms interacting with the social network system will receive the contextually relevant challenge but will likely fail as they will not be appropriately configured to recognize the challenge and provide the appropriate response. Moreover, even where a bot is configured to recognize the contextually relevant challenge and provide a routine for processing the event, the bot will nevertheless likely fail the challenge due to the sheer volume and breadth of information that may be drawn upon by the social network system in constructing the contextually relevant challenge from any of the entity nodes representing enumerable potential real-world concepts. In such a way, the contextually relevant challenge significantly drives up the cost and complexity for yielding a correct challenge response from a computer program, thus thwarting efforts by would-be hackers, scammers, and malicious entities to manipulate the social network system through illegitimate (e.g., non-human user) means, as well as discouraging human users from posting unacceptable content to the social network system, such as spam links, malicious web-linked code, and so forth.

In some embodiments, the monitoring mechanism triggers the contextually relevant challenges based upon certain actions considered more sensitive, such as changing a password on the user's account, changing an email address linked with the user's account, changing a user's name on the user's account, and other such actions that while legitimate, should occur with significantly lesser frequency, and for which heightened scrutiny is warranted.

In one embodiment, the social network system triggers a contextually relevant challenge responsive to the user performing a search and indicating the results are not relevant. For instance, the challenge may simply ask the user if the results were relevant or not, thus providing additional metadata to the social network system in the context of the search string and the results provided.

Blocks 410-425 describe embodiments of how a contextually relevant challenge is made by the social network system. At block 410, the method initiates a contextually relevant challenge for the user of the social network system based on the user's interactions monitored. For instance, when the social network system suspects that actions are being automated by a computer, the user is prompted with a contextually relevant challenge in which the user is asked a question about something that they or their friends are connected to within the entity graph. The contextually relevant challenges are selected and targeted improve the quality of the entity graph, for instance, by populating missing data or updating potentially inaccurate or out of date information.

Thus, for a given user, "Bob," a contextually relevant challenge may be triggered in which Bob is requested to fill out a text entry field requesting the city of his high school, for instance, if it was unknown by the social network system what city Bob's high school was in, or alternatively, if the city was known but the information lacks confidence, or if the city simply needs to be re-verified by a user who should have expert knowledge about the high school, such as the exemplary user "Bob," who has attested within his own personal profile that he attended the high school and thus, should presumably know the city within which it is located.

In another example, a user may be prompted to enter or confirm a genre of a movie. For instance, a contextually relevant challenge may be presented to the user having indicated an affinity for the movie "Gone with the Wind," asking to enter the corresponding genre for the movie, or requesting via the contextually relevant challenge that the user confirm the genre for "Gone with the Wind" as "Romance." In such an example, the user having indicated an affinity for the movie "Gone with the Wind" (e.g., via a "Like," via a mention of the movie in comments, via checking in at a movie screening of the film, etc.), may be considered to be knowledgeable about the movie, and as such, would be both able to successfully respond to the contextually relevant challenge as well as provide useful information to the social network system to either populate the missing genre or to update, confirm, verify, or improve the confidence of the known genre for the movie, as appropriate.

In other embodiments, a user may be requested via the contextually relevant challenge whether two entries are duplicates. For instance, it is feasible that two entries for the movie "Gone with the Wind" have been automatically generated or spawned within the entity graph of the social network system, for example, a first denoted as a "Romance" genre for the movie "Gone with the Wind" and a second denoted as a "War" genre for the movie "Gone with the Wind." A human user familiar with the film will readily understand that both entries are correct and redundant, and thus be able to confirm that, "yes," the entries are duplicates in response to the contextually relevant challenge, thus enabling the user to successfully validate as a legitimate human user of the social network system and further enabling the social network system to capture better quality data, specifically, that the two entries are duplicates, thus allowing, for example, an update to the respective entity nodes by merging the two entity objects and assigning both genres "Romance" and "War" to the single film movie's entity object, "Gone with the Wind."

Selection of the entity objects upon which the contextually relevant challenges are based may be derived from expressly linked relationships between the user's node in the social graph for the user being challenged and entity nodes within the entity graph for which additional input from a knowledgeable user would be helpful to the social network system in populating information, correcting or updating information, or increasing the confidence for known but un-trusted information. Thus, a user being subjected to a contextually relevant challenge may be evaluated to determine which entity nodes are connected with the user's user node, from which it may be determined that the user is connected with, for example, a first entity node corresponding to Lyon's High School for which there is no location information whatsoever in the entity graph, a second entity node for the restaurant Bob's Eatery, in small town, USA, for which the cuisine is unknown, and a third entity node for the band "The Smiths," for which the genre of music is wholly unknown. Thus, should the social network system trigger a contextually relevant challenge for this user, any of these linked entity nodes would be contextually relevant to the user, and each could be improved by populating the missing information, validating known information, or updating potentially out of date information. Thus, the social network system may construct a contextually relevant challenge asking the user: "What city is Lyon's High School in?" The user's challenge response would then be received and stored as known information within the metadata for the entity object "Lyon's High School." The information may or may not be associated with a sufficiently high confidence level, but it will nevertheless be known to the social network system. Subsequent iterations of contextually relevant challenges or other appropriate inquires to different users may later be used to verify the entry such that the information can be established within the social network system with sufficient confidence.

In some embodiments, the contextually relevant challenge presented to the user requires an alphanumeric response within a text entry field. Such an approach is useful where the required information is wholly unknown to the social network system or where the information is known, but for which a correct and matching entry would provide a significant increase in the confidence for such data. In alternative embodiments, the contextually relevant challenge presented to the user requires selection of one of an enumerated list of elements. For instance, for a restaurant requiring the cuisine type as a challenge response, the user may be selected with options to select one of "fine dining," "fast food," "Chinese," "Sports Bar," and so forth. Such a scheme may be utilized for known data lacking confidence, known data requiring re-verification/validation, or wholly unknown data in which the enumerated fields are feasible responses, but for which the correct response is not actually known by the social network system.

According to one embodiment, users of the social network system may navigate to a dedicated page within the social network system which provides crowd sourcing via contextually relevant challenges. At such a page, users of the social network system can iteratively receive contextually relevant challenges and provide challenge responses to them, so as to contribute, via crowd sourcing, to the knowledge of the social network system. In such an embodiment, it is not necessary for the social network system to trigger the contextually relevant challenges to the user, as the user effectively self triggers the challenges, participates in iteratively providing challenge responses to the social network system's challenge inquiries, and then the user navigates away from the page at a time of the user's choosing.

At block 415, the method identifies a plurality of concepts within an entity graph of the social network system contextually relevant to the user of the social network system. For instance, according to one embodiment, the method identifies a plurality of concepts within an entity graph of the social network system contextually relevant to the user of the social network system by retrieving socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both, and by further identifying intersects between the plurality of concepts within the entity graph and the socially relevant data for the user's node within the social graph.

At block 420, the method selects one of the plurality of concepts within the entity graph upon which to base the contextually relevant challenge for the user.

Users of the social network system may be associated with an expertise rating, that is to say, a score or grade which provides a numerical assessment of the particular user's expertise with a given subject matter. The user's expertise rating or numerical assessment of expertise may be utilized in the selection of contextually relevant challenges presented to the user, as well as scoring or grading the importance of a particular user's challenge response to a contextually relevant challenge. Thus, a user's numerical assessment of expertise may be considered in selecting the entity node for which the contextually relevant challenge is based. For example, a higher numerical assessment for a given entity node may provide a greater weighting to that entity node for the user, thus making it more likely to be selected by the social network systems' concept selector which chooses the entity object from the entity graph. The user's numerical assessment of expertise may also be utilized to appropriately weight the user's challenge response to a contextually relevant challenge. For instance, the confidence in data received from the user as part of the user's response challenge may be proportional to the user's numerical assessment of expertise for the given entity. That is to say, where a user has a higher assessment of expertise for a particular entity, that user's response will contribute more greatly to the confidence of the data received in comparison to another user having a lower numerical assessment of expertise for the same entity even when the other user provides the identical challenge response. In such a way, the user's expertise can objectively be utilized to positively affect the quality of data received by the social network system.

In certain embodiments, information may be restricted from inclusion with a concept and thus restricted from global display to all users due to insufficient confidence in the data. In such embodiments, the data may be selectively presented to only users evaluated to have a strong association to the existing concept, in which case the validation engine may purposefully overweight the concept such that a contextually relevant challenge inquiry based on the concept is presented to a user with a strong relationship in an effort to selectively display the low confidence data to a knowledgeable user for the sake of validation or repudiation. In certain embodiments, validation of low confidence data occurs after challenging a certain quantity of users successfully. In other embodiments, validation of low confidence information occurs after attaining a higher confidence scoring over a threshold requirement, in which each user queried contributes to the validation score for the low confidence information based upon the users' expertise for a given concept, as assessed according to the users' contextual relevance to the concept in question. Thus, a user who lives in San Francisco or works in San Francisco may be evaluated as an expert and thus, their affirmative confirmation of an information's veracity responsive to a contextually relevant challenge may contribute more to a validation score than would a user's affirmative confirmation who's contextual relevance to the city of San Francisco is limited to merely "visiting" the city but otherwise lacking a contextual relationship to the city and which may therefore be evaluated as less than an expert according to preferred relationship types for the given entity type (e.g., here "living" in the city being a preferred relationship type over "visiting" the city as the relationship type).

In other embodiments, users with weaker expertise as assessed for a given concept will be wholly prohibited from seeing the low confidence information or being queried as to the veracity of the low confidence information, until such time that the information is adequately verified and made available for global display to all users. In such a way, the social network system can systematically collect information from external to the system, and then "scrub," verify, or authenticate the appropriateness of the potential information by presenting contextually relevant challenges to those users deemed to be sufficiently knowledgeable about the related concept within the entity graph. Working in conjunction with a selection mechanism to choose the entities upon which the challenges are based, the more knowledgeable users can be leveraged by the social network system to populate, update, and validate information pertaining to those concepts of which they are already knowledgeable.

In one embodiment, potential questions are listed in order of need, for instance, priority of populating or updating meta data for a given entity, and the concept selection mechanism chooses a question from an available list based on the priority of the question and based further on the corresponding entity for the question being linked to a user receiving a contextually relevant challenge.

In another embodiment, contextually relevant challenges are selected based upon a user's geographic location associated with a particular entity. For instance, a user visiting Honolulu may be known to be in the city based upon geographic information received by the social network system for that user, and thus, a contextually relevant challenge may be constructed by selecting the entity based upon the user's geographic location and based further on needed metadata about that entity. For example, the user may have visited Diamond Head near Honolulu, and a contextually relevant challenge could be selected based in the entity for Diamond Head and the question constructed based upon needed metadata for Diamond Head. For example, "What is the price of admission to the visitors center at Diamond Head Crater."

Different selection algorithms are also feasible. For instance, the selection mechanism may consider the value of the inquiry to other users of the social network system based on the quantity of links to the entity or based on quantity of searches referencing the entity or the needed information, etc. The selection mechanism may consider the value to the entity graph based on the category of the information. For instance, cuisine of restaurants may be a highly valued category, where as the birthdates of band members may be lesser so, though such priorities are arbitrarily defined and configurable. The selection mechanism may consider the probability that other users are sufficiently capable to answer a needed inquiry, for example, based on connections with a given entity, or other context about the entity. Thus, an obtuse entity with few contextual associations to users may be selected for a user having some but limited contextual relevance to the entity on the basis that very few other users are capable of answering the same inquiry due to a lack of contextual relevance with the entity within the social network system. The selection mechanism may consider known information in instances where correctly validating a user is of greater priority than capturing new data or validating existing data. For instance, the selection mechanism constructs a contextually relevant challenge for a user using known information with high confidence, such that a failed response would be highly indicative of a non-human user. Conversely, the selection mechanism may prioritize capturing new information for the entity graph or updating information within the entity graph over a correct validation assessment. Thus, a response challenge which is correct provides new or updated information to the social network system, whereas an incorrect challenge response may not necessarily be indicative of a non-human user, but rather, may simply be due to the social network system lacking confidence in its known data or lacking any data whatsoever from which to compare the challenge response.

In some embodiments, the selection mechanism considers entities based on an express relationship between the user node in the social graph for the user and an entity node within the entity graph, for instance, if the user indicates they went to a particular high school, they are expressly and directly linked. In other embodiments, the selection mechanism considers inferred or indirect relationships between the user's node in the social graph and an entity node in the entity graph. For instance, if a large proportion of a user node's expressly linked friend nodes attended a particular high school, then it may be inferred that the user also attended the same high school, though not directly linked, and thus, the high school would nevertheless be a contextually relevant entity to the user available for consideration by the selection mechanism.

At block 425, the method constructs an inquiry for the contextually relevant challenge based on missing data of the concept selected or based on data to be updated within the concept selected.

Based on the preceding selection mechanism and criteria for which a particular entity is chosen, the social network system constructs the contextually relevant challenges such that the challenges reflect each particular user's standing in the social graph as that user relates to entities within the entity graph, and as such, the challenges are more likely to present computationally difficult to answer inquires that are easily knowable to a human user of the social network system subjected to such contextually relevant challenges.

Given enough metadata combined with responses and suggestions from many users, enough data may be provided so as to programmatically determine that the correct answer has been identified. For every piece of metadata, eventually the social network system amasses enough data that it can be statistically presumed the right information exists within a threshold margin of error within the social network system, and thus, un-trusted information or information lacking confidence can be made into trusted information after attaining sufficient confidence to consider the information as factually accurate.

For example, a name change for a particular entity object by many different users all suggesting the same thing would yield sufficient confidence in the proposed change to systematically implement the update. An address for an entity, such as a restaurant, may be validated as correct after a threshold number of check-ins at that location, etc. In some embodiments, after a threshold level of confidence is attained, the populated data or updated data is sent to an administrator to review and accept. In other embodiments, the data is accepted by the social network system without human interaction, for instance, given a still further heightened threshold level of confidence.

At block 430, the method presents the contextually relevant challenge having the inquiry therein to the user. For example, the social network system transmits the contextually relevant challenge to the user's interface at the user's client device via the Public Internet. Such presentment of the contextually relevant challenge may be unsolicited by the user, instead being pushed to the user by the social network system responsive to the user's activities or actions with the social network system which are classified or evaluated in such a way that further scrutiny of that user is warranted, for instance, to validate the purported user as an actual human user and not a programmatically executing bot, spammer, or other programmatic entity attempting to illegitimately interact with the social network system.

At block 435, the method receives a challenge response from the user responsive to the contextually relevant challenge. For instance, according to one embodiment, receiving a challenge response from the user responsive to the contextually relevant challenge, further includes the method storing the challenge response from the user as metadata for the concept selected and assessing the challenge response from the user for success or failure. For instance, assessing the challenge response from the user for success or failure may include at least one of: (a) assessing the challenge response as successful when a text string returned as the challenge response matches a known text string of the social network system for the concept selected; (b) assessing the challenge response as successful when a text string returned as the challenge response populates a previously unknown data element of the social network system for the concept selected; (c) assessing the challenge response as successful when an enumerated option selected by the user responsive to the contextually relevant challenge matches a known value of the social network system for the concept selected; and (d) assessing the challenge response as a failure when a value returned as the challenge response is different than a known correct value of the social network system for the concept selected.

After block 435, the method may simply end or may iterate through block 401, returning to the start of the method 400, so as to continue monitoring the user's interactions within the social network system.

Figure 4B:
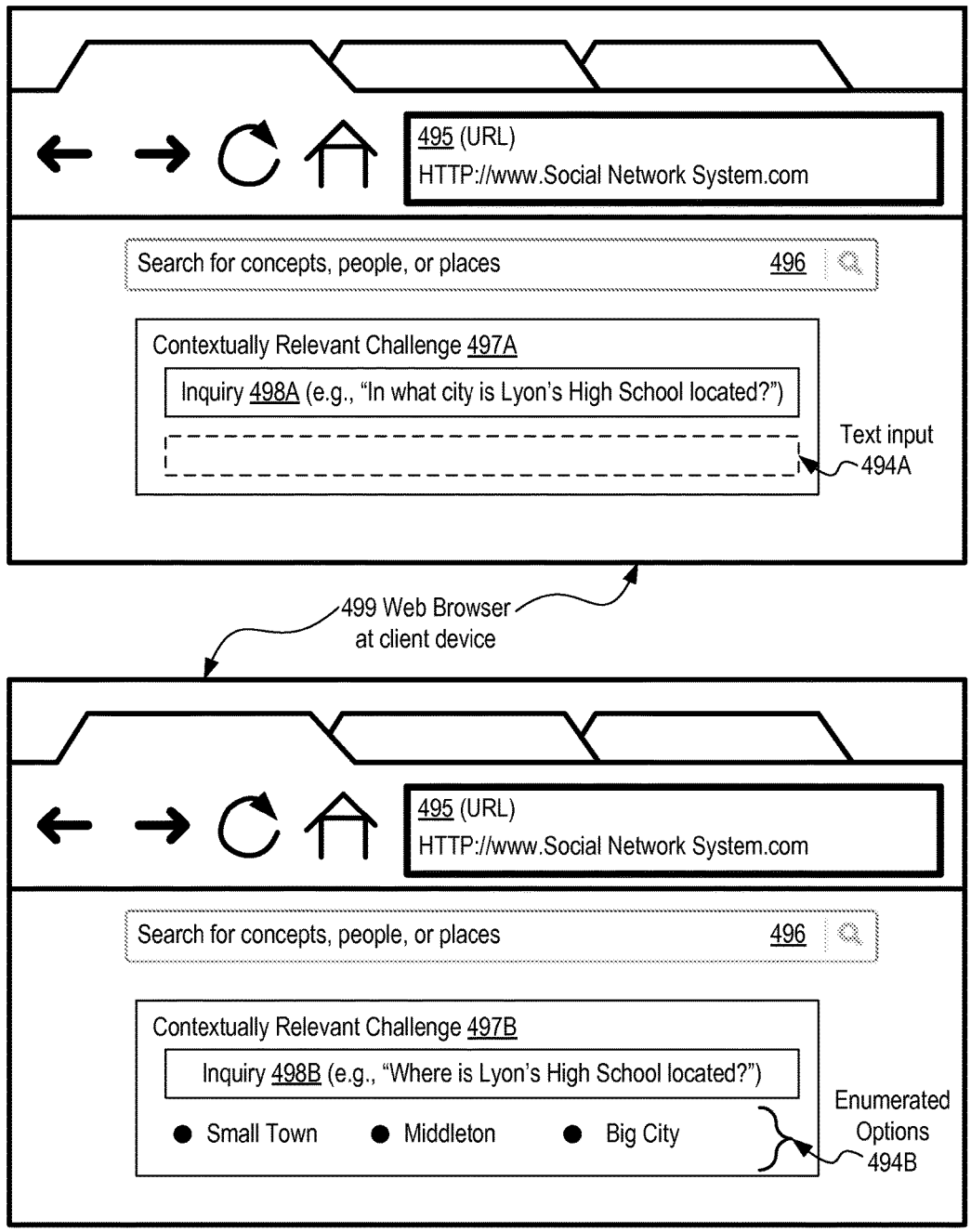
FIG. 4B is an exemplary web browser user interface at a client device according to described embodiments.

FIG. 4B is an exemplary web browser user interface at a client device according to described embodiments. In particular, web browser 499 is depicted at a user interface of a client device which may receive the contextually relevant challenges 497A and 497B. At the top of the web browser 499 user interface, it can be seen that the URL 495 is directed toward the front end serving web interface of the social network system (e.g., via the fictitious HTTP://www.Social Network System.com web address). On this particular page display view, there is a search box 496, into which a user can type any concept, person, or place, such as the proposed "Search for concepts, people, or places."

Within the upper web browser 499 user interface, the contextually relevant challenge 497A presented to the user's client device includes the inquiry 498A in which it is asked, by way of example: "In what city is Lyon's High School located?" For the contextually relevant challenge 497A there is further a text input 494A within which a user may type any alphanumeric string as the challenge response in fulfillment of the contextually relevant challenge 497A. For example, the user may enter, "small town" responsive to the challenge's inquiry 498A. Within the lower web browser 499 user interface the contextually relevant challenge 497B presented to the user's client device includes the inquiry 498B in which it is asked, by way of example: "Where is Lyon's High School located?" For the contextually relevant challenge 497B there are further presented multiple enumerated options 494B from which the user may select one. In particular, depicted are the selectable enumerated options 494B "Small Town," Middleton," and "Big City." Selecting one of the enumerated options 494B responsive to the contextually relevant challenge 497B returns the corresponding challenge response from the user's client device upon which the web browser 499 is located to the social network system, for instance, to receive the input as metadata and further to perform validation of the challenge response from the user.

Figure 5:
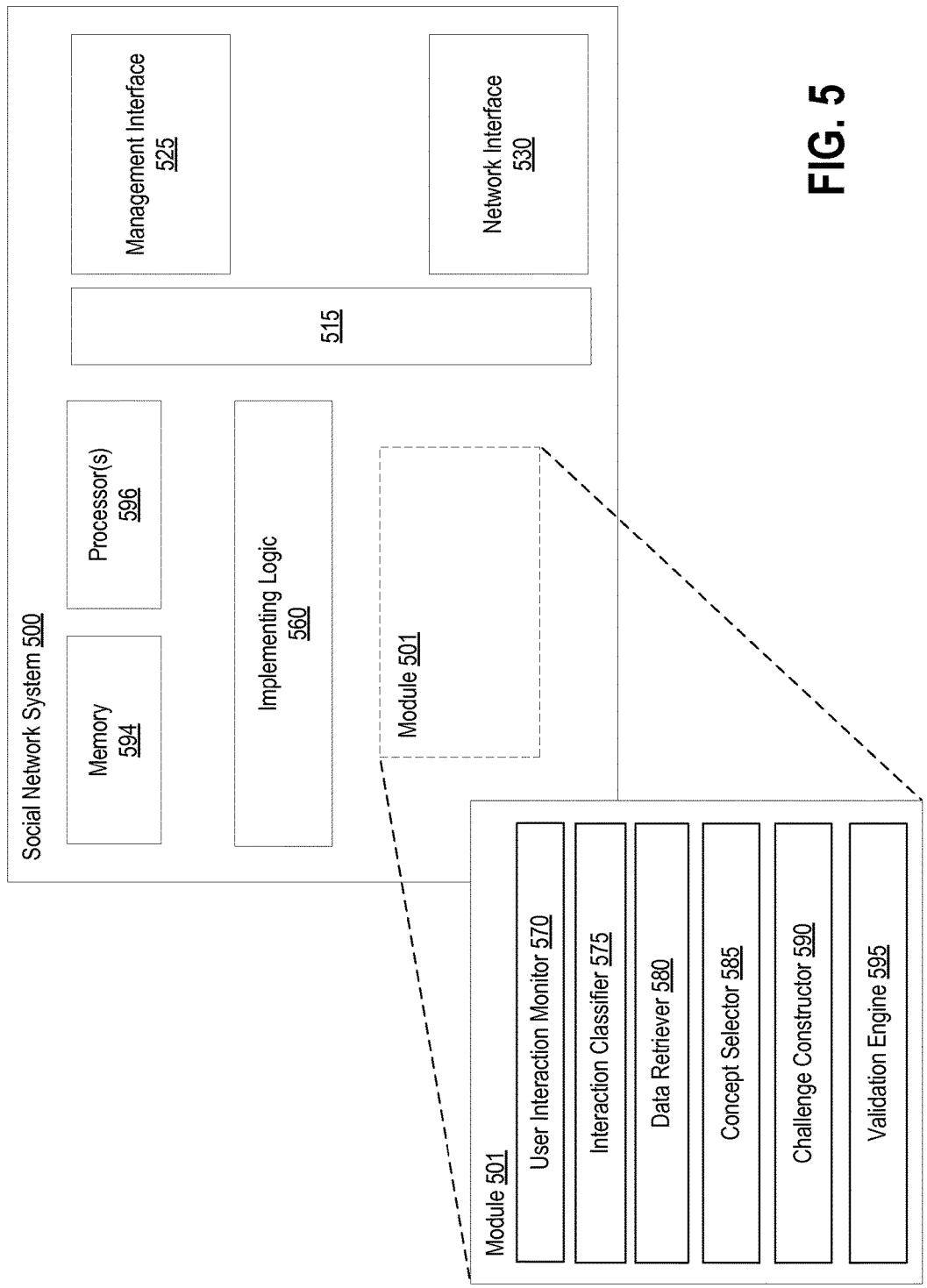
FIG. 5 shows a diagrammatic representation of a social network system having a module optionally configured therein in accordance with which embodiments may operate.

FIG. 5 shows a diagrammatic representation of a social network system 500 having module 501 optionally configured therein in accordance with which embodiments may operate.

In one embodiment, system 500 includes a memory 594 and a processor or processors 596. For example, memory 594 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes management interface 525, for example, to retrieve information, receive requests, return responses, and otherwise interface with client devices, third party servers, enterprise servers, and other elements located separately from system 500. System 500 further includes network interface 530 to communicate information via a network, such as the cloud or the public Internet, etc., as communicatively interfaced with the social network system 500.

Distinct within system 500 is module 501 which includes User Interaction Monitor 570, Interaction Classifier 575, Data Retriever 580, Concept Selector 585, Challenge Constructor 590, and Validation Engine 595. Module 501 may be installed and configured in a compatible system 500 as is depicted by FIG. 5, or provided separately so as to operate in conjunction with appropriate implementing logic 560 or other software. Module 501 may be located in any of the previously described embodiments of social network system at element 20 of FIGS. 1-3, as previously described.

Thus, it is in accordance with one embodiment that a system 500 having a processor 596 and memory 594 therein includes a user interaction monitor 570 to monitor a user's interactions with the social network system; an interaction classifier 575 to initiate a contextually relevant challenge for the user of the social network system based on the user's interactions monitored; a data retriever 580 to identify a plurality of concepts within an entity graph of the social network system contextually relevant to the user of the social network system; a concept selector 585 to select one of the plurality of concepts within the entity graph upon which to base the contextually relevant challenge for the user; a challenge constructor 590 to build an inquiry for the contextually relevant challenge based on missing data of the concept selected or based on data to be updated within the concept selected; a validation engine 595 to present the contextually relevant challenge having the inquiry therein to the user; and in which the validation engine 595 is to further receive a challenge response from the user responsive to the contextually relevant challenge.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618, which communicate with each other via a bus 630. Main memory 604 and its sub-elements (e.g. 622, 623 and 624) are operable in conjunction with processing logic 626 and processor 602 to perform the methodologies discussed herein.

For example, main memory 604 includes entity graph (e.g., concept database) 624 having therein entity objects representing entity nodes; social graph 623 having therein user objects representing user nodes; and software 622.

User interaction monitor 633 implements the various methodologies described above, such as monitoring users' interactions with the social network system such that they may be classified or evaluated and if necessary, such that a contextually relevant challenge may be initiated and constructed via challenge constructor 634 for presentment to a user's interface responsive to the user's suspect interactions.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
    monitoring a user's interactions with a communication system subsequent to a successful authentication of the user to access the communication system;
    initiating a contextually relevant challenge for the user of the communication system based on at least one of the user's monitored interactions being an attempted interaction that is indicative of a non-human interaction;
    identifying a plurality of concepts within an entity graph of the communication system contextually relevant to the user of the communication system, the plurality of concepts determined to be contextually relevant to the user based on connections between nodes representing the plurality of concepts and a node representing the user;
    selecting one of the plurality of concepts within the entity graph upon which to base the contextually relevant challenge for the user based on a numerically assessed expertise of the user with each of the plurality of concepts;
    identifying missing data from metadata stored by the communication system associated with the selected concept or data within the metadata associated with the selected concept having a confidence level below a threshold;
    constructing an inquiry for the contextually relevant challenge in response to identifying the missing data of the selected concept or the data within the selected concept having the confidence level below the threshold;
    presenting the contextually relevant challenge having the inquiry therein to the user;
    receiving a challenge response from the user responsive to the contextually relevant challenge;
    storing the challenge response from the user in the metadata for the selected concept when the challenge response includes the identified missing data of the selected concept or matches the data within the selected concept having the confidence level below the threshold;

assessing the challenge response from the user for success or failure;

canceling the attempted interaction when the challenge response is assessed as a failure or the attempted interaction is determined to be a prohibited interaction; and processing the attempted interaction when the challenge response is assessed as a success and the attempted interaction is determined to be a permitted interaction.

2. The method of claim 1, wherein monitoring the user's interactions with the communication system comprises at least one of:

monitoring interactions of the user;
monitoring groups of interactions by the user;
monitoring a sequence of interactions by the user;
monitoring a rate of interactions with the communication system by the user;
monitoring text of interactions submitted to the communication system by the user;
monitoring web links of interactions submitted to the communication system by the user;
monitoring for specified types of interactions with the communication system by the user; and
monitoring a quantity of interactions with the communication system within a pre-determined time period.

3. The method of claim 2:
wherein the interactions are classified as good or bad interactions; and
wherein the interactions classified as bad are indicative of a programmatic non-human user interacting with the communication system.

4. The method of claim 1, wherein monitoring the user's interactions with the communication system comprises monitoring for spamming, overposting, flooding, bot interactions, comments in all capitals (CAPS), or sensitive user transactions necessitating user validation beyond username and password based authentication.

5. The method of claim 1, wherein initiating the contextually relevant challenge for the user of the communication system based on the user's monitored interactions, comprises at least one of:

triggering the contextually relevant challenge for the user based on the user navigating to a 404 or not found error page;
triggering the contextually relevant challenge for the user based on the user navigating to a dedicated page within the communication system which provides crowd sourcing via contextually relevant challenges;
triggering the contextually relevant challenge for the user subsequent to a random or pre-determined quantity of interactions;
triggering the contextually relevant challenge for the user subsequent to a random or pre-determined period of time; and
triggering the contextually relevant challenge for the user based on the user having a numerically assessed expertise over a threshold for a specified entity node within the entity graph of the communication system.

6. The method of claim 1, wherein identifying the plurality of concepts within an entity graph of the communication system contextually relevant to the user of the communication system, comprises:

retrieving socially relevant data for a user's node within a social graph of the communication system including (a) socially relevant data of the user's node describing relationships to friend nodes of the user's node within the social graph and (b) one or more linked concept nodes within the entity graph expressly related to the user's node within the social graph or to the friend nodes of the user's node or both; and identifying intersects between the plurality of concepts within the entity graph and the socially relevant data for the user's node within the social graph.

7. The method of claim 6, wherein selecting one of the plurality of concepts within the entity graph upon which to base the contextually relevant challenge for the user, further comprises:

selecting one of the plurality of concepts within the entity graph based on the identified intersects.

8. The method of claim 1, wherein selecting one of the plurality of concepts within the entity graph upon which to base the contextually relevant challenge for the user, further comprises one or more of:

selecting based on social relevance of the inquiry to the user being challenged by the inquiry;
selecting based on estimated value of the inquiry to other users of the communication system;
selecting based on probability the user subjected to the contextually relevant challenge is able to correctly answer the inquiry;
selecting based on inability of other users within the communication system to correctly answer the inquiry of the contextually relevant challenge;
selecting based on priority of validating candidate data that is known but lacking confidence and may be answerable by the user responding to the inquiry of the contextually relevant challenge;
and
selecting based on a prioritized list of genres or categories for the plurality of concepts within the entity graph upon which the inquiry of the contextually relevant challenge is based.

9. The method of claim 1, wherein constructing the inquiry for the contextually relevant challenge based on missing data of the selected concept or based on data to be updated within the selected concept, comprises one or more of:

constructing an inquiry to the user to confirm a genre or category for the concept;
constructing an inquiry to the user to confirm duplicative results for the concept, wherein merging of the duplicative results or elimination of one of the duplicative results is subsequently initiated based at least in part on the confirmation of the duplicative results;
constructing an inquiry to the user to select one from a plurality of enumerated options for the concept; and
constructing an inquiry to the user to enter text into a text input for the concept.

10. The method of claim 1, wherein presenting the contextually relevant challenge having the inquiry therein to the user, comprises:

transmitting from the communication system to a user interface at a client device for the user, the contextually relevant challenge having the inquiry therein via a public Internet responsive to the user's monitored interactions with the communication system.

11. The method of claim 1, wherein assessing the challenge response from the user for success or failure, comprises at least one of:

assessing the challenge response as successful when a text string returned as the challenge response matches a known text string of the communication system for the selected concept;

assessing the challenge response as successful when a text string returned as the challenge response populates a previously unknown data element of the communication system for the selected concept;

assessing the challenge response as successful when an enumerated option selected by the user responsive to the contextually relevant challenge matches a known value of the communication system for the selected concept; and assessing the challenge response as a failure when a value returned as the challenge response is different than a known correct value of the communication system for the selected concept.

12. The method of claim 1, wherein receiving the challenge response from the user responsive to the contextually relevant challenge, further comprises:

applying a confidence score to the challenge response from the user proportional to the numerically assessed expertise of the user with the selected concept; and adding the applied confidence score to a data entry for the concept.

13. A non-transitory computer readable storage medium having instructions stored thereon that, when executed by a processor of a communication system, cause the communication system to perform operations comprising:

monitoring a user's interactions with the communication system subsequent to a successful authentication of the user to access the communication system;

initiating a contextually relevant challenge for the user of the communication system based on at least one of the user's monitored interactions being an attempted interaction that is indicative of a non-human interaction;

identifying a plurality of concepts within an entity graph of the communication system contextually relevant to the user of the communication system, the plurality of concepts determined to be contextually relevant to the user based on connections between nodes representing the plurality of concepts and a node representing the user;

selecting one of the plurality of concepts within the entity graph upon which to base the contextually relevant challenge for the user based on a numerically assessed expertise of the user with each of the plurality of concepts;

identifying missing data from metadata stored by the communication system associated with the selected concept or data within the metadata associated with the selected concept having a confidence level below a threshold;

constructing an inquiry for the contextually relevant challenge in response to identifying the missing data of the selected concept or the data within the selected concept having the confidence level below the threshold;

presenting the contextually relevant challenge having the inquiry therein to the user;

receiving a challenge response from the user responsive to the contextually relevant challenge;

storing the challenge response from the user in the metadata for the selected concept when the challenge response includes the identified missing data of the selected concept or matches the data within the selected concept having the confidence level below the threshold;

assessing the challenge response from the user for success or failure;

canceling the attempted interaction when the challenge response is assessed as a failure or the attempted interaction is determined to be a prohibited interaction; and processing the attempted interaction when the challenge response is assessed as a success and the attempted interaction is determined to be a permitted interaction.

14. The non-transitory computer readable storage medium of claim 13, wherein monitoring the user's interactions with the communication system comprises monitoring for spamming, overposting, flooding, bot interactions, comments in all CAPs, or sensitive user transactions necessitating user validation beyond username and password based authentication.

15. The non-transitory computer readable storage medium of claim 13, wherein identifying the plurality of concepts within the entity graph of the communication system contextually relevant to the user of the communication system, comprises:

retrieving socially relevant data for a user's node within a social graph of the communication system including (a) socially relevant data of the user's node describing relationships to friend nodes of the user's node within the social graph and (b) one or more linked concept nodes within the entity graph expressly related to the user's node within the social graph or to the friend nodes of the user's node or both; and identifying intersects between the plurality of concepts within the entity graph and the socially relevant data for the user's node within the social graph.

16. A communication system comprising:

a processing device; and a memory coupled to the processing device, the memory storing instructions which, when executed by the processing device, cause the communication system to:

monitor a user's interactions with the communication system subsequent to a successful authentication of the user to access the communication system;

initiate a contextually relevant challenge for the user of the communication system based on at least one of the user's monitored interactions being an attempted interaction that is indicative of a non-human interaction;

identify a plurality of concepts within an entity graph of the communication system contextually relevant to the user of the communication system, the plurality of concepts determined to be contextually relevant to the user based on connections between nodes representing the plurality of concepts and a node representing the user;

select one of the plurality of concepts within the entity graph upon which to base the contextually relevant challenge for the user based on a numerically assessed expertise of the user with each of the plurality of concepts;

identify missing data from metadata stored by the communication system associated with the selected concept or data within the metadata associated with the selected concept having a confidence level below a threshold;

construct an inquiry for the contextually relevant challenge in response to identifying the missing data of the selected concept or the data within the selected concept having the confidence level below the threshold;

present the contextually relevant challenge having the inquiry therein to the user;

receive a challenge response from the user responsive to the contextually relevant challenge;

store the challenge response from the user in the metadata for the selected concept when the challenge response includes the identified missing data of the selected concept or matches the data within the selected concept having the confidence level below the threshold;

assess the challenge response from the user for success or failure;

cancel the attempted interaction when the challenge response is assessed as a failure or the attempted interaction is determined to be a prohibited interaction; and process the attempted interaction when the challenge response is assessed as a success and the attempted interaction is determined to be a permitted interaction.

* * * * *